(12) United States Patent
Arunkumar et al.

(10) Patent No.: US 10,326,773 B2
(45) Date of Patent: Jun. 18, 2019

(54) ENSURING THE CREDIBILITY OF DEVICES FOR GLOBAL ATTESTATION

(71) Applicant: International Business Machines Corporation, Armonk, NY (US)

(72) Inventors: Saritha Arunkumar, Basingstoke (GB); Diyanesh B. Chinnakkonda Vidyapoornachary, Bangalore (IN); Douglas J. Cowie, Bishopstoke (GB); Farheen Munshi, Lancashire (GB); Saravanan Sethuraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 15/288,757

(22) Filed: Oct. 7, 2016

(65) Prior Publication Data

US 2018/0103021 A1    Apr. 12, 2018

(51) Int. Cl.
*H04L 29/06* (2006.01)
(52) U.S. Cl.
CPC .................. *H04L 63/108* (2013.01)
(58) Field of Classification Search
CPC .............................. H04L 63/08; H04L 63/102
USPC ............................................................. 726/3
See application file for complete search history.

(56) References Cited

U.S. PATENT DOCUMENTS

| | | | |
|---|---|---|---|
| 8,918,479 B2 | 12/2014 | O'Connell et al. | |
| 9,276,905 B2 | 3/2016 | Coker, II et al. | |
| 9,282,120 B2 | 3/2016 | Islam et al. | |
| 2006/0112418 A1* | 5/2006 | Bantz | G06F 21/88 726/4 |
| 2010/0031047 A1* | 2/2010 | Coker, II | H04L 63/0281 713/176 |
| 2011/0313925 A1* | 12/2011 | Bailey, Jr. | G06Q 40/02 705/44 |
| 2014/0222955 A1 | 8/2014 | Islam et al. | |
| 2015/0019254 A1* | 1/2015 | Ibikunle | G06F 21/6245 705/3 |

OTHER PUBLICATIONS

Wu et al., A Reputation-Based Identity Management Model for Cloud Computing, Hindawa Publishing Corporation, pp. 1-15.

* cited by examiner

*Primary Examiner* — Jason K Gee
*Assistant Examiner* — Angela R Holmes
(74) *Attorney, Agent, or Firm* — Patterson + Sheridan, LLP (57) ABSTRACT

Embodiments disclose systems, methods, and computer program products to perform an operation for adapting a set of devices used to authenticate a client device. The operation generally includes determining a plurality of broker devices available for attesting a location of a client device, and determining, from the available broker devices, a first and second subset of broker devices based on a credibility score determined for each of the available broker devices. The operation also includes attesting the location of the client device based on information received from the first subset of broker devices regarding devices in proximity to each of the broker devices in the first subset. The operation further includes upon determining that a number of responses with the information from at least one of the broker devices in the first subset has reached a threshold, reassigning broker devices in the first and second subsets.

20 Claims, 5 Drawing Sheets

FIG. 2

TRIGGER LIMIT 6
REQUEST RESPONSE CYCLE 1

| DEVICES | CREDIBLE (M/L) | SCORE | RESPONSE FREQUENCY |
|---|---|---|---|
| D1 | MORE | 16 | 5 |
| D2 | MORE | 15 | 4 |
| D3 | MORE | 12 | 4 |
| D4 | MORE | 10 | 2 |
| D5 | LESS | 5 | 0 |
| D6 | LESS | 7 | 0 |
| D7 | LESS | 4 | 0 |
| D8 | LESS | 3 | 0 |
| D9 | LESS | 9 | 0 |
| D10 | LESS | 8 | 0 |

D2 RESPONDS ↓

TRIGGER LIMIT 6
REQUEST RESPONSE CYCLE 2

| DEVICES | CREDIBLE (M/L) | SCORE | RESPONSE FREQUENCY |
|---|---|---|---|
| D1 | MORE | 16 | 5 |
| D2 | MORE | 15 | 5 |
| D3 | MORE | 12 | 4 |
| D4 | MORE | 10 | 2 |
| D5 | LESS | 5 | 0 |
| D6 | LESS | 7 | 0 |
| D7 | LESS | 4 | 0 |
| D8 | LESS | 3 | 0 |
| D9 | LESS | 9 | 0 |
| D10 | LESS | 8 | 0 |

TRIGGER LIMIT 6
REQUEST RESPONSE CYCLE 3

| DEVICES | CREDIBLE (M/L) | SCORE | RESPONSE FREQUENCY |
|---|---|---|---|
| D1 | MORE | 16 | 5 |
| D2 | MORE | 15 | 6 |
| D3 | MORE | 12 | 4 |
| D4 | MORE | 10 | 2 |
| D5 | LESS | 5 | 0 |
| D6 | LESS | 7 | 0 |
| D7 | LESS | 4 | 0 |
| D8 | LESS | 3 | 0 |
| D9 | LESS | 9 | 0 |
| D10 | LESS | 8 | 0 |

D2 RESPONDS ↓

TRIGGER LIMIT 6
REQUEST RESPONSE CYCLE 4

| DEVICES | CREDIBLE (M/L) | SCORE | RESPONSE FREQUENCY |
|---|---|---|---|
| D1 | MORE | 16 | 5 |
| D2 | MORE | 15 | 6 |
| D3 | MORE | 12 | 4 |
| D4 | MORE | 10 | 2 |
| D5 | LESS | 5 | 0 |
| D6 | LESS | 7 | 0 |
| D7 | LESS | 4 | 0 |
| D8 | LESS | 3 | 0 |
| D9 | LESS | 9 | 0 |
| D10 | LESS | 8 | 0 |

SHUFFLE ⤴

TRIGGER LIMIT 6
SHUFFLED LIST

| DEVICES | CREDIBLE (M/L) | SCORE | RESPONSE FREQUENCY |
|---|---|---|---|
| D1 | MORE | 16 | 5 |
| D5 | LESS | 13 | 0 |
| D3 | MORE | 12 | 4 |
| D4 | MORE | 10 | 2 |
| D6 | LESS | 7 | 0 |
| D7 | LESS | 4 | 0 |
| D8 | LESS | 3 | 0 |
| D9 | LESS | 9 | 0 |
| D10 | LESS | 8 | 0 |
| D2 | MORE | 0 | 0 |

ENSURING THE CREDIBILITY OF DEVICES FOR GLOBAL ATTESTATION

BACKGROUND

The present disclosure generally relates to device authentication, and more specifically, to techniques for ensuring the credibility of devices for global attestation.

Many applications and services today use real-time information about users' locations to provide information and other application related content to users. Some examples of location based applications include applications that allow users to transmit "check-in" at various locations (e.g., restaurants, coffee shops, stores, concerts, and other places or events), mapping and navigation applications, applications that offer incentives and discounts based on a user's location, etc. Given that the location information from a user's device plays a critical part in any location based transaction, location based applications and services typically attempt to verify that the right user is attempting to access the location based service before completing the location based transaction. That is, applications generally attempt to verify that the location information (e.g., global positioning system (GPS) coordinates) received from the user's device corresponds to the device's actual geo-location.

Location based services can use a variety of different mechanisms to attest the location information received from a user. Local attestation, for example, is one such mechanism in which a location based service uses nearby devices in proximity to the device requesting access to the location based service to attest the requesting device's location information. For example, if a device A requests to access a location based service via an access point, device A may send its location information along with identification information of other devices B and C (in proximity to device A) to the location based service. Once received, the location based service can request location information from each of devices B and C and identification information of any devices in proximity to devices B and C. The location based service can cross-check the received location and identification information received from each device in order to determine if device A's location information is accurate.

In some cases, however, a set of devices can collude with each other in order to circumvent the local attestation procedure and misrepresent the true location of a device attempting to access the location based service. Consequently, location based applications and services generally use global attestation as a mechanism to prevent such collusion attempts. Typically, in global attestation, which is based in part on local attestation, the location based service uses the contextual information of the requesting device (e.g., type of previous requests, locations associated with previous requests, etc.) in addition to location reports (of the requesting device) received from nearby devices in proximity to the requesting device in order to attest the requesting device's location information. Global attestation, however, can still be susceptible to malicious actors that may attempt to gain unauthorized access to a location based application or service (e.g., by misrepresenting (or faking) the location information that is submitted to the location based service).

SUMMARY

One embodiment presented herein describes a method for adapting a set of broker devices used to authenticate a client device. The method generally includes determining a plurality of broker devices available for attesting a location of a client device, wherein each of the broker devices is in proximity to the client device, and determining from the plurality of available broker devices, a first subset of broker devices and a second subset of broker devices based on a credibility score determined for each of the available broker devices. The method also includes attesting to an application the location of the client device based on information received from the first subset of broker devices regarding one or more devices in proximity to each of the broker devices in the first subset. The method further includes upon determining that a number of responses with the information from at least one of the broker devices in the first subset has reached a threshold, reassigning one or more of the broker devices in the first subset and second subset.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments presented herein provide techniques for adapting a set of devices used to authenticate a client device in order to ensure the credibility of such devices when performing an attestation procedure.

For example, a location based application (or service) may use an attestation procedure (such as global attestation) to authenticate a device requesting access to (or content from) the location based application. In such a procedure, the location based service attests the location information received from the requesting device by validating credentials (e.g., GPS coordinates, identification information of nearby devices, etc.) from devices surrounding the requesting device (referred to herein as broker devices). Such broker devices, for example, may be connected to the same access point as the requesting device. Typically, the location based service maintains a list of broker devices that can be used for authenticating a given requesting device. During the attestation procedure, the location based service broadcasts requests to all broker devices and may process responses from a subset of the broker devices. Performing an attestation procedure in this manner, however, can be time-consuming and inefficient. As the number of broker devices grows, for example, the location based service may have to poll an increasing number of broker devices, process responses from the broker devices, etc., all of which may increase the latency that a user experiences when requesting authentication from the location based service.

Additionally, in the conventional attestation procedure, it is possible for malicious actors to identify and gain control over the broker devices (e.g., by listening to network traffic, identifying the broker devices receiving the most traffic, and performing a targeted attack on the broker devices), which the malicious actors, in turn, can use to grant one or more devices unauthorized access to a location based service. For example, a malicious actor may identify a device (e.g., device X) that it wants to comprise and begin monitoring network traffic between device X and the location based service (e.g., such as tracking a request from device X to the location based service for user authentication). When the location based service begins to perform the attestation procedure for device X, the malicious actor may monitor the location based service's request to a set of n broker devices ($B_1, B_2, \ldots B_n$), and track responses from the n broker devices to determine the number of m broker devices ($B_1, \ldots B_m$) out of the set of n broker devices that responded (e.g., where m<n). At the same time, the malicious actor can record the credentials send by each m device. The malicious actor, in turn, can track the location based service's response to device X to confirm that the service processed information from the m broker devices. For example, the malicious actor can confirm by monitoring for an acknowledgement (ACK) or negative ACK (NACK) transmitted from the service to device X. If the malicious actor does not detect a response from the service, it may mean that the acknowledgement for authentication was not sent.

Once the malicious actor identifies a set of brokers used for the attestation procedure, the malicious can perform a targeted attack in order to comprise the attestation procedure. For example, the malicious actor can generate a false (or fake) request to mimic a device with credentials, such as username/password, etc. (assuming they have already been comprised), and monitor for the service's request to the m broker devices for their credential information. Once requested, the malicious actor can generate the previously recorded credentials of each broker device ($B_1, \ldots, B_m$) and return the generated credentials to the location service in order to gain authentication for the unauthorized device. In another example, the malicious actor can comprise the attestation procedure by gaining physical access to the broker devices and controlling whether the devices are allowed to process attestation requests. The malicious actor can do so, for example, by performing a denial of service (DOS) attack such that legitimate attestation request are denied by brokers refusing to attest the location of requesting devices.

Embodiments presented herein provide techniques for adapting the set of broker devices that a location based service uses to attest the location information of a device requesting access to the location based service.

In one embodiment, a global attestation tool maintains a set of M credible broker devices out of N total devices. The set of M credible broker devices can be initially selected on various criteria such as location, processing capability, etc. The global attestation tool can maintain a credibility score for each device in the set of M broker devices. The tool may determine the credibility score based on various different types of historical merit information. For example, the global attestation tool can consider information such as the broker device response ratio (e.g., the number of times the broker device previously responded out of a set of requests from the attestation tool), the response time (e.g., amount of time it took the broker device to respond to the global attestation tool), location of the broker device (e.g., the number of hops between the global attestation tool and broker device), etc.

Once determined, the global attestation tool can separate (or distribute) the set of M broker devices into a first subset of more credible devices (MCDs) and a second subset of less credible devices (LCDs) based on determining which of the devices' credibility scores satisfy a predefined threshold. For example, with respect to the set of M broker devices, the global attestation tool can determine a subset of MCDs= $\{D_1 \ldots D_A\}$, where each device in MCD has a credibility score that satisfies a determined threshold, and a subset of LCDs=$\{D_{A+1} \ldots D_M\}$, where each device in LCD has a credibility score that does not satisfy the determined threshold.

In one embodiment, the global attestation tool may shuffle one or more devices in the MCD list with one or more devices in the LCD list based on a threshold limit T to reduce the likelihood of malicious actors identifying and gaining control of the set of broker devices that are used to attest the location information of the device requesting access to the global attestation tool. In one embodiment, the threshold limit T may specify the maximum number of credential processing (e.g., how many times the broker device has responded to a request from the global attestation tool) that each broker device is allowed to perform. The global attestation tool can determine the threshold limit T based on one or more criteria, including, but not limited to, the number of times the broker device has previously responded (e.g., within a window of time), the broker device's location (e.g., whether the broker device is in a high risk location or low risk location for malicious attempts), the type of information or data being requested (e.g., how sensitive is the information), actual queries for information (or content), population size where the broker device is located, GPS coordinates of the broker device, etc.

Once the threshold limit T is determined, the global attestation tool monitors the credential processing performed by each broker device. Upon determining that one or more devices have reached the threshold limit T, the global attestation tool can reassign (e.g., perform a shuffling of) the devices in the broker device list. For example, in one embodiment, the global attestation tool can reassign the broker devices in the MCD set (that have reached the T limit) to the LCD set and reassign the same number of broker devices in the LCD set to the MCD set. The global attestation tool may then update the set of broker devices M with the new broker devices for the next processing sequence.

By periodically shuffling (or reassigning) devices in the MCD set, embodiments reduce the likelihood of malicious actors identifying the brokers in the MCD set that are used in an attestation procedure, and individually targeting the devices. For example, without shuffling the broker devices, malicious actors, as noted, could monitor network traffic, and identify the broker devices receiving the most traffic as the devices that are most trusted by the global attestation tool, potentially rendering such devices vulnerable to a focused attack. Note that the many of the following embodiments refer to a global attestation procedure as one type of attestation procedure where the techniques presented herein can be used to reduce the chances of (and prevent) malicious actors from gaining control of the process used to authenticate a user. In general, however, the techniques presented herein can be applied to other authentication schemes that interact with other devices to attest the location of the device requesting access to the location based service.

Figure 1:
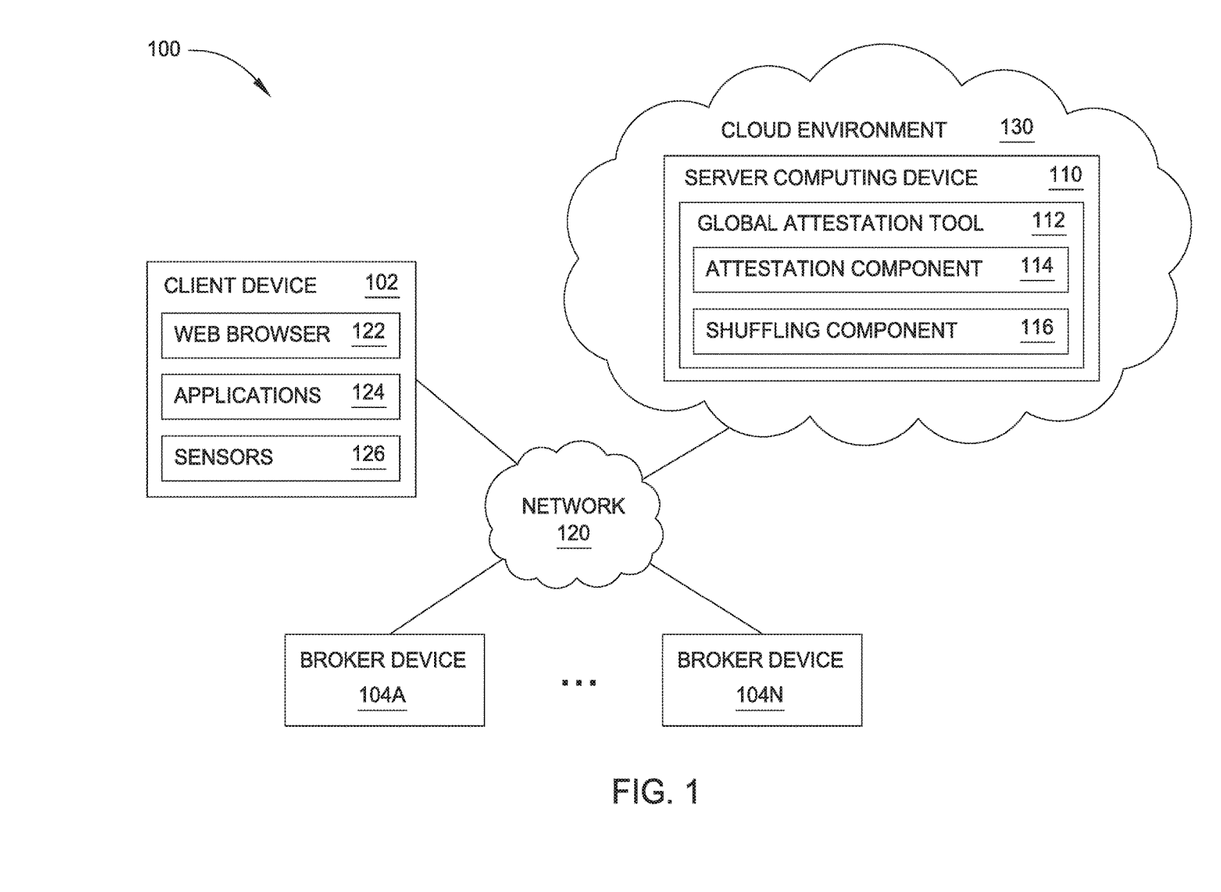
FIG. 1 illustrates an example computing environment configured to adapt a set of broker devices used in an attestation procedure, according to one embodiment.

FIG. 1 illustrates an example computing environment configured to adapt (or shuffle) the set of broker devices used to attest the location of a device (e.g., a client device) requesting access to a location based service, according to one embodiment. As shown, the computing environment 100 includes a client device 102 and broker devices 104A-N connected to a cloud platform environment 130 via a network 120. The network 120, in general, may be a wide area network (WAN), local area network (LAN), wireless LAN (WLAN), personal area network (PAN), a cellular network, etc. In a particular embodiment, the network 120 is the Internet.

Client device 102 and broker devices 104A-N are included to be representative of a variety of computing devices, such as a desktop, laptop, mobile device, smartphone, tablet computer, portable gaming device, and the like. A user may use client device 102 to access location based services and/or content hosted in the cloud environment 130. For example, the client device 102 includes a web browser 122, application(s) 124 and sensors 126 for accessing location based services and/or content in the cloud environment 130. Generally application 124 may be any type of location based application, examples of which include entertainment applications, social networking applications, personal navigation applications, mapping applications, geo-advertising applications, security applications, and the like. In one example, a user can execute application 124 (on client device 102) to check-in at different locations (e.g., in return for points or discounts, to interact with other users, etc.). In one example, a user can execute application 124 to request and/or locate transportation services (e.g., such as taxi-cab, rental vehicle, nearest bus stop, etc.). In one example, a user can execute application 124 to locate entertainment venues (e.g., such as nearest movie theatres, restaurants, etc.), access particular content (e.g., files stored in the cloud, streaming services, and the like). The application 124 can use one or more sensors 126 to determine the location (e.g., geographical coordinates) of the client device 102. For example, sensors 126 can include GPS sensors, proximity sensors, communication sensors, etc.

The application 124 can generate and send a request for content (or services) that includes the client device's location information (e.g., GPS coordinates) along with other identifying information of the client device (e.g., such as media access control (MAC) address) to the server computing device 110 in the cloud environment 130. The server computing device 110 is included to be representative of one or more servers hosted in the cloud that, in general, provide services to applications 124 based on the location of the client device 102. Examples of such services can include social networking services, file storage services, mapping and navigation services, etc.

In one embodiment, once the server 110 receives a request for content from the client device 102, the server 110 may authenticate the client device 102 before delivering the requested content (or services) to the client device. That is, the server 110 may determine if the client device 102 is authorized to receive the requested content by attesting the client device's 102 location information in the request. As shown, the server 110 includes a global attestation tool 112 which is generally configured to authenticate a device (e.g., client device 102) requesting access to content hosted in the cloud computing environment. For example, the global attestation tool 112 can use the attestation component 114 to verify the location information received from client device 102 via one or more broker devices 104A-N in proximity to the client device 102.

In one embodiment, the attestation component 114 can assign a rank (or credibility score) to each broker device 104 that is eligible for an attestation procedure (e.g., such as global attestation). The attestation component 114 can determine the rank based on various criteria, examples of which can include the device's response ratio, response time, location of the broker device, and the like. Once assigned, the attestation component 114 can determine an initial set of "credible" broker devices 104 from the number of eligible broker devices 104 based on the rank determined for each broker device 104. In one example, the attestation component 114 can determine a set of M "credible" broker devices 104 from the N eligible broker devices (where M<N) if the rank for each broker device 104 in the set of M broker devices satisfies a defined threshold.

Once the attestation component 114 determines the set of M "credible" broker devices 104, the attestation component 114 can separate the set of M broker devices 104 into different subsets of broker devices based on their determined rank. For example, in one embodiment, with respect to the set of M broker devices, the attestation component 114 can create a set of "more credible devices" (MCDs) and a set of "less credible devices" (LCDs) based on determining which of the broker devices in the set of M devices has a score that satisfies another defined threshold. Once created, the global attestation tool 112 can use the set of MCDs for processing authentication requests from each client device 102.

In one embodiment, when the global attestation tool 112 receives a request from the client device for authentication (e.g., in order to access content hosted in the cloud environment 130), the global attestation tool 112 can use the attestation component 114 to request location reports from each broker device 104 in the set of M broker devices. Each location report may include the respective broker device's location (e.g., longitude, latitude), timestamp, identifier for the broker device 104 (e.g., a MAC address or other identifier), identifiers (e.g., MAC addresses) of devices in proximity to the broker device 104, etc. When the attestation component 114 receives responses from the broker devices 104 in the set of M broker devices, the attestation component 114 can process and extract location reports from the broker devices 104 in the MCD set.

The global attestation tool 112 can use the shuffling component 116 to monitor the number of times the attestation component 114 uses a broker device 104 in the MCD set. In one embodiment, once the shuffling component 116 determines that a broker device 104 in the MCD set has reached a determined threshold limit T for the maximum number of responses (e.g., to the global attestation tool 112), the shuffling component 116 can reassign the broker devices 104 in the MCD set. For example, as described in more detail below with respect to FIGS. 2 and 3, the shuffling component 116 can replace one or more broker devices 104 in the MCD set with one or more broker devices 104 in the LCD set. In this manner, embodiments herein can shuffle the broker devices 104 that are used to attest the location of a device requesting access to a location based service in order to reduce the likelihood of malicious actors gaining control of such devices.

Note FIG. 1 illustrates merely one reference example of a computing environment 100 in which the techniques described herein can be used to ensure the credibility of broker devices for an attestation procedure. Those of ordinary skill in the art will recognize that other configurations of the computing environment 100 may be adapted to for other attestation procedures. For example, although FIG. 1 illustrates a global attestation tool 112 located on server computing device 110, the global attestation tool 112 may be distributed across multiple servers 110 or computing devices.

Figure 2:
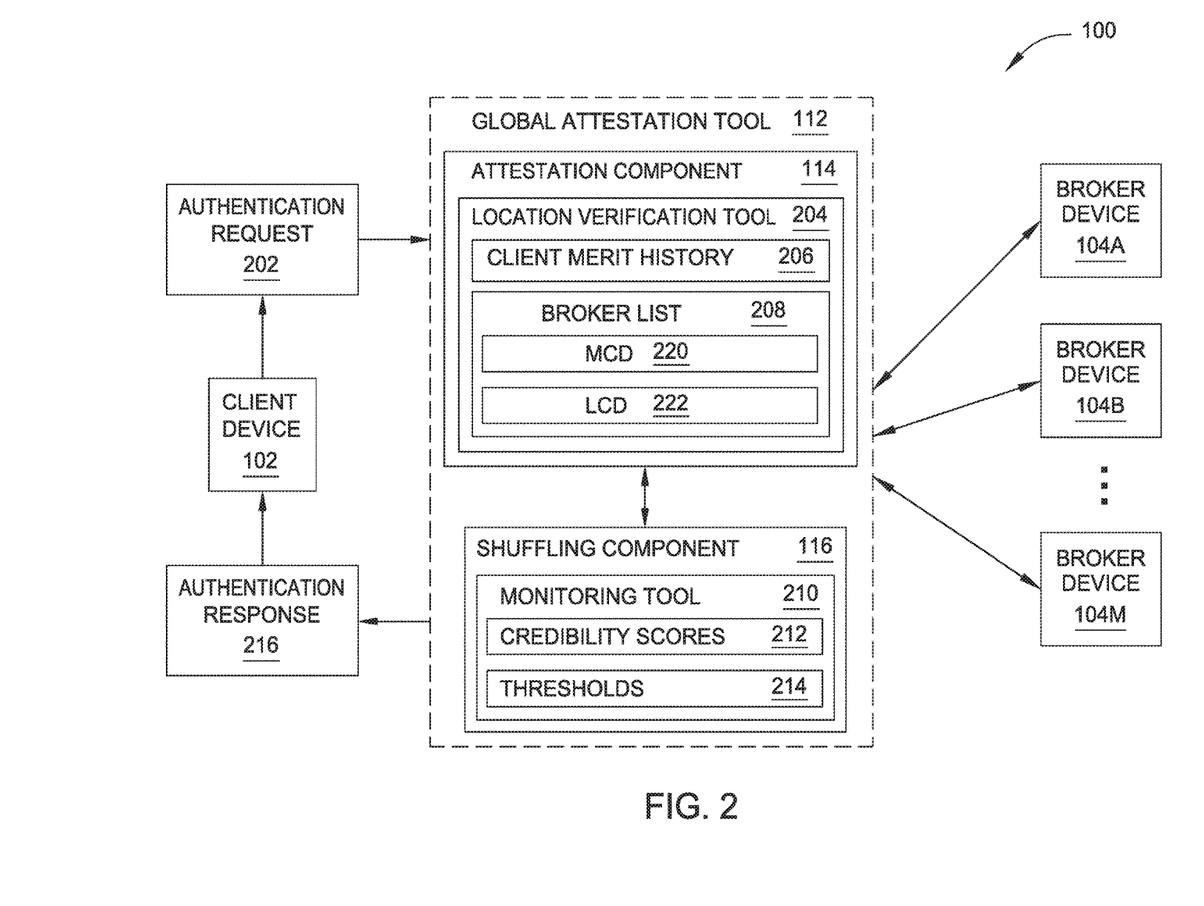
FIG. 2 further illustrates components of the computing environment configured to adapt a set of broker devices used in an attestation procedure, according to one embodiment.

FIG. 2 further illustrates components of the global attestation tool 112, described relative to FIG. 1, according to one embodiment. As shown in this embodiment, a client device 102 that wants to access content and/or services from a location based application (e.g., in the cloud) can transmit an authentication request 202 to the global attestation 112. Such authentication request 202 may include the location of the client device 102, identifying information of devices (e.g., one or more broker devices 104) in proximity to the client device 102, locations of the identified broker devices, etc. Once received, the global attestation tool 112 can use the attestation component 114 to attest the location of the client device 102 via one or more broker devices 104 in proximity to the client device 102. As shown, the attestation component 114 includes a location verification tool 204, which includes a broker list 208 specifying one or more broker devices that are eligible for the attestation procedure. In one embodiment, the broker devices in the broker list 208 may include a subset of broker devices (e.g., set of M "credible" broker devices) from a larger set of broker devices (e.g., set of N eligible broker devices). As noted, the attestation component 114 can further demarcate the broker list 208 into a set of MCDs 220 and LCDs 222 based on the credibility score determined for each broker device in the broker list 208.

In one embodiment, the location verification tool 204 can request location reports from the broker devices in the broker list 208 (e.g., broker devices 104A-M) in order to verify that the location of the client device 102 received in the authentication request 202 is accurate. Upon receiving responses from each broker device 104A-M, the location verification tool 204 can process responses from the broker devices in the MCD set 220. In addition to processing location reports from the broker devices in the MCD set 220, the location verification tool 204 can also consider the historical merit information 206 from the client device 102. Such information can include locations of the client device 102 received in previous authentication requests, type of previous requests, etc. The location verification tool 204 can use the historical merit information 206 to determine if the client device 102 is misrepresenting its location for the current authentication request. For example, assume that a client device submits a request to access a location based service from London at 9 AM, and makes another request to access the same location based service from New York at 11 AM. In such an example, the location verification tool 204 may be able to determine that the client device is misrepresenting its location based on evaluating the contextual request history for that client device. Based on the determination, the location verification tool 204 can transmit an authentication response 216 to the client device 102 that grants or rejects access by the client device 102 to the location based service or application.

Alternatively, or additionally, in one embodiment, for each broker device in the MCD set 220 that the location verification tool 204 processes a location report from, the location verification tool 204 may also verify the physical location of the broker device (e.g., via GPS coordinates) before determining that the client device 102 is authorized to access the location based service. For example, the location verification tool 204 can fetch the location information from each broker device in the MCD set 220 or from other devices surrounding the respective broker devices.

In one embodiment, the attestation component 114 can continue to process location reports from each broker device in the MCD set 220 until the shuffling component 116 determines that one or more devices in the MCD set 220 have reached a determined threshold limit T for maximum number of responses. As shown, the shuffling component 116 includes a monitoring tool 210, which is configured to monitor the response frequency of each broker device in the broker list 208 based on thresholds 214. As noted, the shuffling component 116 can determine the threshold limit T based on the number of times the broker device has previously responded (e.g., within a window of time), level of risk at the broker device's location, the type of information being requested, actual queries, population size where the broker device is located, GPS coordinates of the broker device, etc. In one embodiment, the shuffling component 116 can determine a single threshold limit T for all broker devices in the broker list 208. In one embodiment, the shuffling component 116 can determine a different threshold limit T for each broker device in the broker list 208.

In one embodiment, once the shuffling component 116 (via the monitoring tool 210) determines that one or more broker devices in the MCD set 220 have reached the threshold for processing authentication requests, the shuffling component 116 can move the broker devices (that have reached the threshold limit) from the MCD set 220 to the LCD set 222 and move the same number of broker devices from the LCD set 222 to the MCD set 220. In one embodiment, the shuffling component 116 can choose broker devices in the LCD set that have the highest credibility scores 212 (or rank) when moving broker devices in the LCD set 222 to the MCD set 220. In one embodiment, the shuffling component 116 can reset the credibility score 212 (e.g., to zero or some other initial value) for each broker device in the MCD set 220 moved to the LCD set 222.

In some embodiments, the shuffling component 116 can employ a linear scheme when shuffling (or reassigning) the broker devices in the broker list 208. For example, in one implementation, the shuffling component 116 can use a round robin scheme to shuffle the broker devices. In general, however, the shuffling component 116 can employ any metric to shuffle the broker devices. In some embodiments, the shuffling component 116 can determine the shuffling metric to use based on a determine level of security (e.g., employed by the location based service) and/or the number of available broker devices. In some embodiments, the shuffling component 116 can invalidate and purge all entries in the broker list 208 in order to regenerate a new broker list 208. The shuffling component 116, for example, may do so periodically, based on user input, based on determining that one or more broker devices have been compromised, based on detecting an attempt to compromise one or more broker devices (e.g., a hacking inference), and so on. Once the shuffling component 116 reassigns the respective broker devices between the MCD and LCD sets, the shuffling component 116 updates the broker list 208 with the broker devices that can be used for the next processing request. In this manner, embodiments reduce (and can prevent) the likelihood of malicious actors gaining control of the authentication process by monitoring the network usage of broker devices and triggering the shuffling of broker devices between different lists based on a defined threshold limit. Doing so can prevent attackers from identifying any one broker device (e.g., based on monitoring network traffic) being used in the MCD set as a more credible broker device.

Moreover, even in situations where malicious actors could identify these devices, such devices would be available for use for a limited time, as techniques herein can remove the comprised devices from the attestation procedure.

Figure 3:
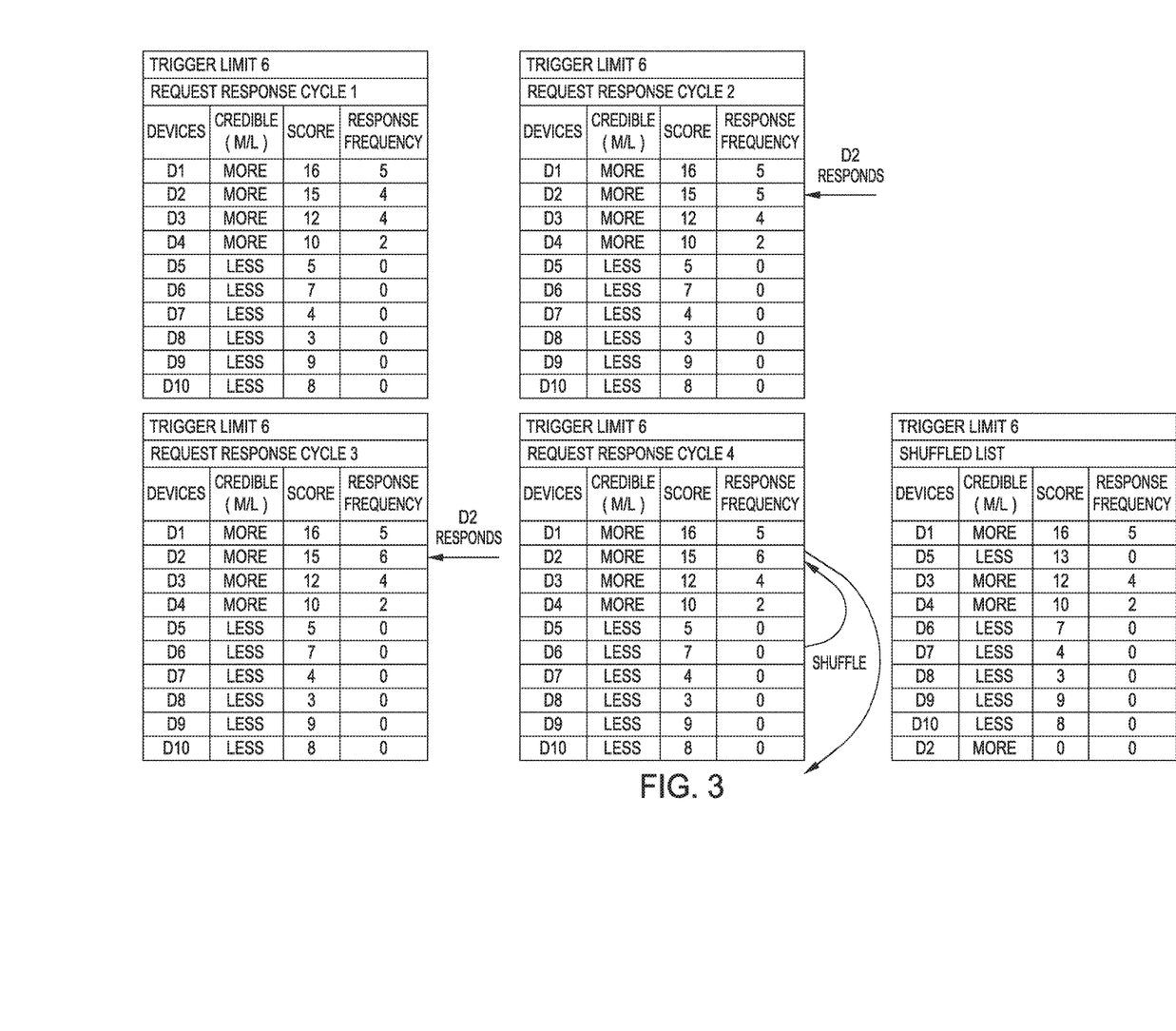
FIG. 3 illustrates an example of shuffling broker devices between different lists of broker devices, according to one embodiment.

FIG. 3 illustrates one reference example of shuffling (or reassigning) broker devices between a MCD set of broker devices and a LCD set of broker devices based on a threshold limit, according to one embodiment. As shown in this embodiment, the global attestation tool 112 determines a set of ten broker devices D1-D10 (e.g., for broker list 208) that are available to attest the location of the client device. Within this set, the global attestation tool 112 determines that D1-D4 are MCDs (e.g., based on a score threshold>=10) and determines that D5-D10 are LCDs (e.g., based on a score threshold<10). The global attestation tool 112 also determines a threshold limit of six for triggering the shuffling of broker devices in the list.

The global attestation tool 112 can use the monitoring tool 210 to monitor the number of times each device D1-D10 responds to the global attestation tool 112 with a location report. For example, as shown, the global attestation tool 112 (via monitoring tool 210) can detect that, for request response cycles 2-3, broker device D2 is being used to attest the location of the client device. Once the global attestation tool 112 determines that broker device D2 reaches the threshold limit (trigger limit=6) for responding to attestation requests, the global attestation tool 112 (via the shuffling component 116) triggers a shuffling of the broker devices D1-D10. For example, as shown, the global attestation tool 112 moves (or reassigns) broker device D2 from the set of MCDs to the set of LCDs.

At the same time, the global attestation tool 112 reassigns one of the broker devices (e.g., broker device D5) in the set of LCD devices to the set of MCD devices. As noted, the global attestation tool 112 can select the particular broker devices in the LCD to reassign to the MCD set based on the devices that have the highest score in the LCD set. However, in other embodiments, the global attestation tool 112 can choose the broker devices to reassign to the MCD set based on other criteria. After reassigning the broker devices, the global attestation tool 112 can reset the credibility scores for one or more of the reassigned broker devices. In this example, the global attestation tool 112 resets the credibility score of D2 to zero and determines a credibility score of 13 for D5.

Figure 4:
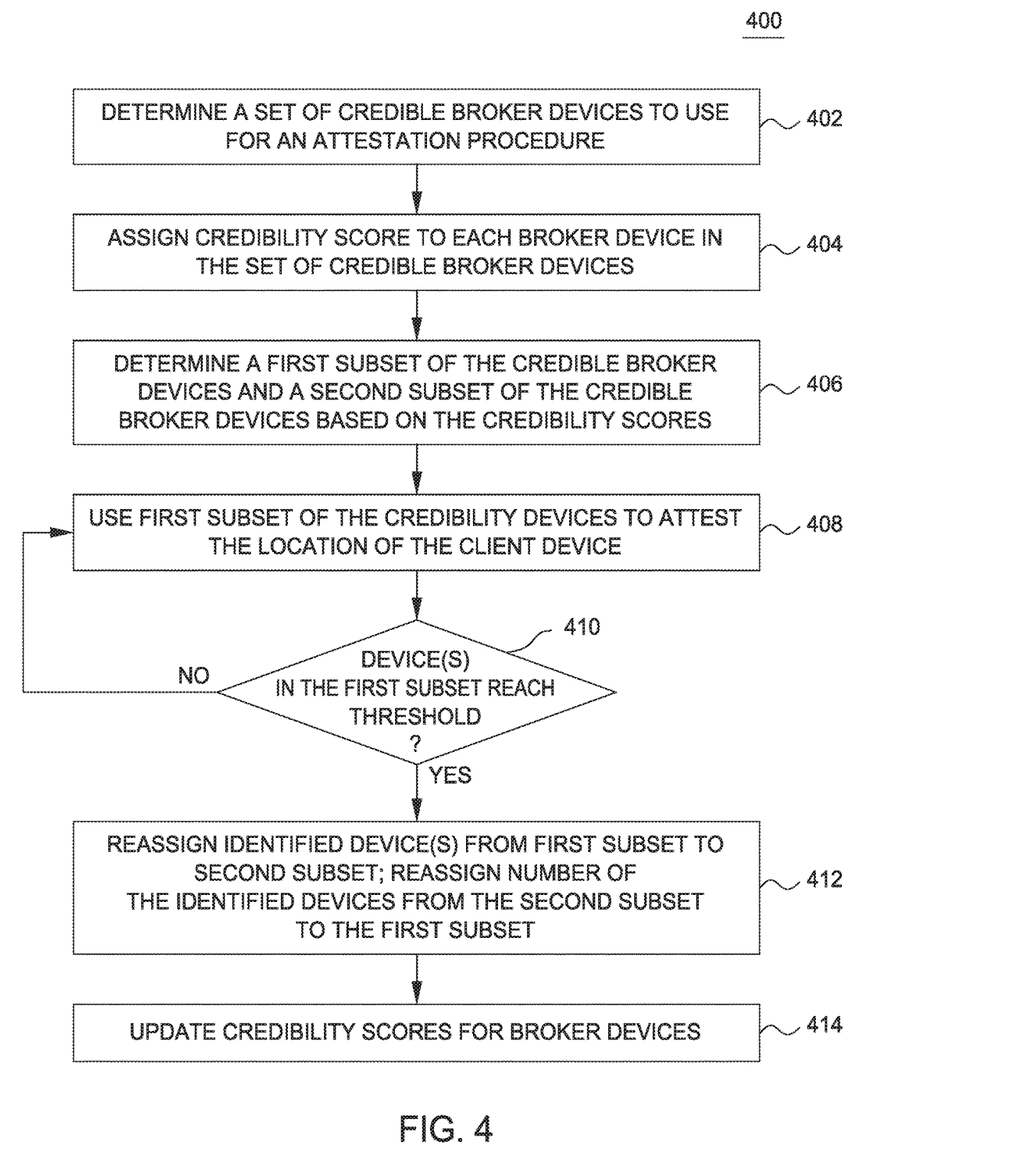
FIG. 4 is a flow chart illustrating a method for adapting a set of broker devices used in an attestation procedure, according to one embodiment.

FIG. 4 illustrates a method 400 for adapting a set of broker devices for an attestation procedure, according to one embodiment. As shown, the method 400 begins at block 402 where the global attestation tool 112 determines a set of credible broker devices to use for an attestation procedure. Each of the credible broker devices may be a device in proximity to a client device. For example, in one embodiment, each of the credible broker devices may be connected to the same access point as the client device. At block 404, the global attestation tool 112 assigns a credibility score to each broker device in the set of credible broker devices. As noted, the global attestation tool 112 can determine the credibility score (or rank) to assign to each broker device based on the broker device's response ratio, response time, location of the broker device, and the like.

At block 406, the global attestation tool 112 determines a first subset of the credible broker devices and a second subset of the credible broker devices based on the credibility scores. For example, the first subset of credible broker devices may include MCDs and the second subset of credible broker devices may include LCDs. The global attestation tool 112 may include a broker device in the MCDs if the global attestation tool 112 determines the broker device has a credibility score that satisfies a predetermined threshold. Such threshold, for example, may be determined based on the level of security implemented for the location based service, level of risk associated with the set of broker devices, size of the population of broker devices, etc.

At block 408, the global attestation tool 112 uses the first subset of the credible devices to attest the location of the client device. That is, for a given authentication request received from a client device, the global attestation tool 112 may process location reports from the first subset of credible devices (e.g., MCDs). Each location report can include information (e.g., MAC IDs, GPS coordinates, etc.) regarding one or more devices in proximity to the device sending the location report. In one embodiment, the global attestation tool 112 can continue to process location reports from the first subset of credible devices until the global attestation tool 112 determines that one or more devices in the first subset reaches a threshold for responding to the global attestation tool 112 (block 410). If so, the global attestation tool 112 reassigns the identified one or more devices from the first subset (e.g., MCDs) to the second subset (e.g., LCDs), and reassigns a number of the identified devices from the second subset to the first subset (e.g., if the global attestation tool 112 identifies five devices in the MCD set that reach the threshold, the global attestation tool 112 may reassign five devices in the LCD set to the MCD set). At block 414, the global attestation tool 112 updates the credibility scores for the broker devices. For example, in one embodiment, the global attestation tool 112 can reset the scores of the broker devices moved into the LCD set (e.g., to zero). Likewise, in one embodiment, the global attestation tool 112 can update the credibility scores of the broker devices moved into the MCD set.

Advantageously, the techniques presented herein can ensure credibility of broker devices used to attest the location of a client device, in order to minimize or eliminate the likelihood of malicious actors identifying and compromising the broker devices.

Figure 5:
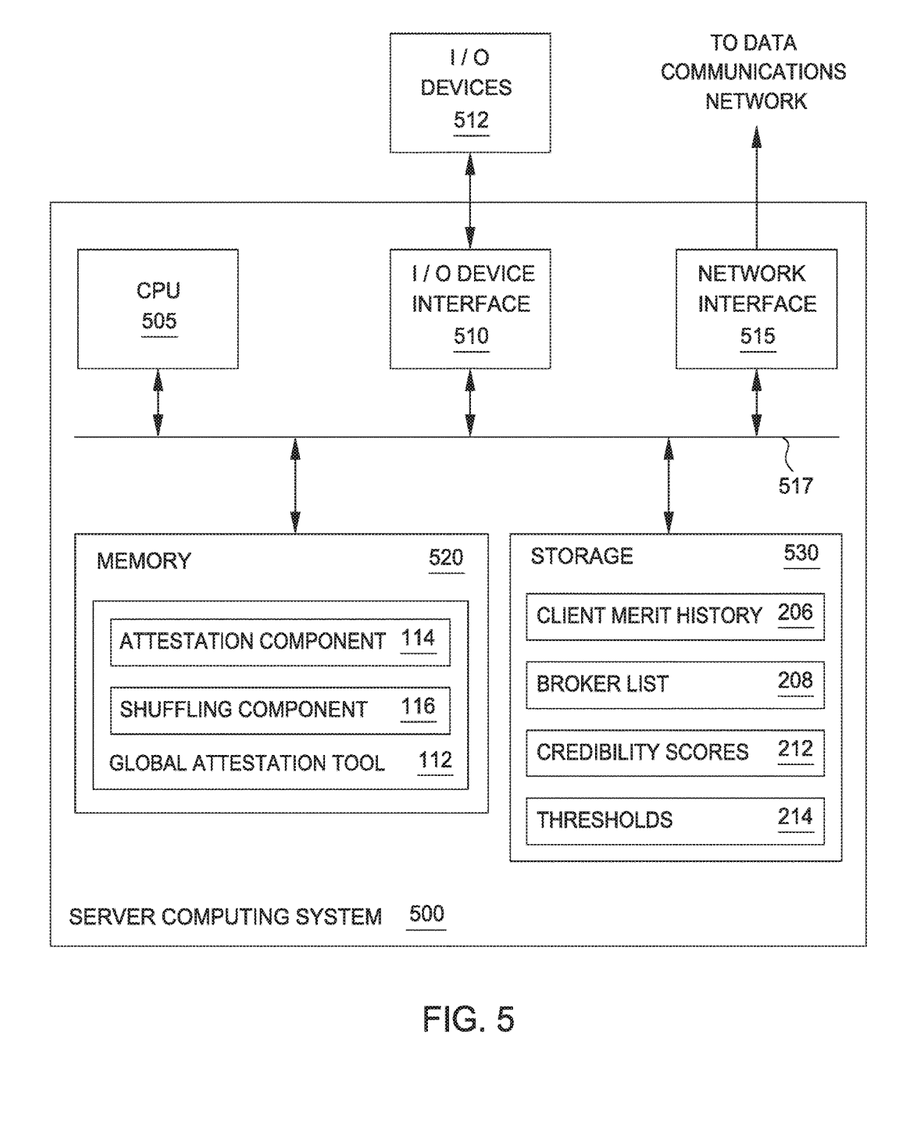
FIG. 5 is a block diagram of a computing system configured to adapt a set of broker devices used in an attestation procedure, according to one embodiment.

FIG. 5 illustrates an example server computing system 500 configured to adapt a set of broker devices used in an attestation procedure, according to one embodiment. As shown, the computing system 500 includes, without limitation, a central processing unit (CPU) 505, a network interface 515, a memory 520, and storage 530, each connected to a bus 517. The computing system 500 may also include an I/O device interface 510 connecting I/O devices 512 (e.g., keyboard, display and mouse devices) to the computing system 500. The computing system 500 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

The CPU 505 retrieves and executes programming instructions stored in the memory 520 as well as stored in the storage 530. The bus 517 is used to transmit programming instructions and application data between the CPU 505, I/O device interface 510, storage 530, network interface 515, and memory 520. Note, CPU 505 is included to be representative of a single CPU, multiple CPUs, a single CPU having multiple processing cores, and the like, and the memory 520 is generally included to be representative of a random access memory. The storage 530 may be a disk drive or flash storage device. Although shown as a single unit, the storage 530 may be a combination of fixed and/or removable storage devices, such as fixed disc drives, removable memory cards, optical storage, network attached storage (NAS), or a storage area-network (SAN).

Illustratively, the memory 520 includes a global attestation tool 112, which includes attestation component 114 and shuffling component 116, all of which are described in greater detail above. Further, storage 530 includes client merit history 206, broker list 208, credibility scores 212, and thresholds 214, all of which are described in greater detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access location based applications or related data available in the cloud. For example, a client device 102 may submit authentication requests to the global attestation tool 112 in order to access location based content and/or services in the cloud. The global attestation tool 112, in turn, may attest the location of the client device via one or more broker devices 104 using the techniques described above. Doing so allows location based application and/or services to authenticate users from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method to authenticate client devices via broker devices while reducing susceptibility to network vulnerabilities resulting from broker device identification, the computer-implemented method comprising:
   determining a plurality of broker devices available for attesting a first location of a first client device, the plurality of broker devices including a first broker device and a second broker device, wherein each of the plurality of broker devices is in proximity to the first client device;
   determining, from the plurality of available broker devices, a primary subset of broker devices and a secondary subset of broker devices, based on a credibility score determined for each of the available broker devices, the primary subset including the first broker device, the secondary subset including the second broker device;
   attesting, to a first application, the first location of the first client device based on information received from the primary subset of broker devices regarding one or more devices in proximity to each of the broker devices in the primary subset; and
   upon determining that a count of responses with the information from the first broker device in the primary subset has reached a threshold count, performing, by operation of one or more computer processors, a defensive broker swap operation comprising swapping the first and second broker devices between the primary and secondary subsets.

2. The computer-implemented method of claim 1, wherein the credibility score determined for each broker device is based on at least one of: a response ratio for the respective broker device, a response time for the respective broker device, and a location of the respective broker device.

3. The computer-implemented method of claim 1, wherein the threshold count is determined based on at least one of: the respective count of responses for each broker device, a location of each broker device, a type of data requested by each broker device, and a total count of available broker devices.

4. The computer-implemented method of claim 1, wherein swapping the first and second broker devices comprises:
   reassigning the first broker device from the primary subset to the secondary subset; and
   reassigning the second broker device from the secondary subset to the primary subset.

5. The computer-implemented method of claim 1, wherein the defensive broker swap operation comprises purging one or more broker devices from the determined plurality of broker devices available for attestation.

6. A system to authenticate client devices via broker devices while reducing susceptibility to network vulnerabilities resulting from broker device identification, the system comprising:
   one or more computer processors; and
   a memory containing a program which, when executed by the one or more computer processors, performs an operation comprising:
      determining a plurality of broker devices available for attesting a first location of a first client device, the plurality of broker devices including a first broker device and a second broker device, wherein each of the plurality of broker devices is in proximity to the first client device;
      determining, from the plurality of available broker devices, a primary subset of broker devices and a secondary subset of broker devices, based on a credibility score determined for each of the available broker devices, the primary subset including the first broker device, the secondary subset including the second broker device;
      attesting, to a first application, the first location of the first client device based on information received from the primary subset of broker devices regarding one or more devices in proximity to each of the broker devices in the primary subset; and
      upon determining that a count of responses with the information from the first broker device in the primary subset has reached a threshold count, performing a defensive broker swap operation comprising swapping the first and second broker devices between the primary and secondary subsets.

7. The system of claim 6, wherein the credibility score determined for each broker device is based on at least one of: a response ratio for the respective broker device, a response time for the respective broker device, and a location of the respective broker device.

8. The system of claim 6, wherein the threshold count is determined based on at least one of: the respective count of responses for each broker device, a location of each broker device, a type of data requested by each broker device, and a total count of available broker devices.

9. The system of claim 6, wherein swapping the first and second broker devices comprises:
   reassigning the first broker device from the primary subset to the secondary subset; and
   reassigning the second broker device from the secondary subset to the primary subset.

10. The system of claim 6, wherein the defensive broker swap operation comprises purging one or more broker devices from the determined plurality of broker devices available for attestation, wherein the purging occurs upon detecting that the available broker devices have been compromised.

11. A computer program product to authenticate client devices via broker devices while reducing susceptibility to network vulnerabilities resulting from broker device identification, the computer program product comprising:
   a non-transitory computer-readable medium having computer-readable program code embodied therewith, the computer-readable program code executable by one or more computer processors to perform an operation comprising:
      determining a plurality of broker devices available for attesting a first location of a first client device, the plurality of broker devices including a first broker device and a second broker device, wherein each of the plurality of broker devices is in proximity to the first client device;
      determining, from the plurality of available broker devices, a primary subset of broker devices and a secondary subset of broker devices based on a credibility score determined for each of the available broker devices, the primary subset including the first broker device, the secondary subset including the second broker device;
      attesting, to a first application, the first location of the first client device based on information received from the primary subset of broker devices regarding one or more devices in proximity to each of the broker devices in the primary subset; and
      upon determining that a count of responses with the information from the first broker device in the primary subset has reached a threshold count, performing a defensive broker swap operation comprising swapping the first and second broker devices between the primary and secondary subsets.

12. The computer program product of claim 11, wherein the credibility score determined for each broker device is based on at least one of: a response ratio for the respective broker device, a response time for the respective broker device, and a location of the respective broker device.

13. The computer program product of claim 11, wherein the threshold count is determined based on at least one of: the respective count of responses for each broker device, a location of each broker device, a type of data requested by each broker device, and a total count of available broker devices.

14. The computer program product of claim 11, wherein the defensive broker swap operation comprises purging one or more broker devices from the determined plurality of broker devices available for attestation, wherein the purging occurs upon detecting that one ore more of the available broker devices have been compromised.

15. The computer-implemented method of claim 1, further comprising:
   attesting, to a second application, a second location of a second client device based on information received from the second broker device of the primary subset of broker devices, thereby reducing a measure of susceptibility of any of the primary subset of broker devices being identified as a broker device by via traffic sniffing, at least relative to a static primary set of one or more broker devices.

16. The computer-implemented method of claim 15, wherein the primary subset of broker devices comprises a subset of comparatively higher credibility, wherein the secondary subset of broker devices comprises a subset of comparatively lower credibility, wherein the computer-implemented method further comprises:
   maintaining a respective count of responses specific to each broker device, wherein that the count of responses has reached the threshold count is determined based on the count of responses maintained for the first broker device.

17. The computer-implemented method of claim 16, wherein the computer-implemented method is performed by a global attestation tool having a plurality of components including an attestation component and a shuffling component;

wherein the attestation component is configured to attest the first and second locations of the first and second client devices, respectively;

wherein the shuffling component is configured to perform the defensive broker swap operation.

18. The computer-implemented method of claim 17, wherein the credibility score determined for each broker device is based on: a response ratio for the respective broker device, a response time for the respective broker device, and a location of the respective broker device;

wherein the threshold count is determined based on: the respective count of responses of each broker device, a location of each broker device, a type of data requested by each broker device, and a total count of available broker devices.

19. The computer-implemented method of claim 18, wherein swapping the first and second broker devices comprises: reassigning the first broker device from the primary subset to the secondary subset and reassigning the second broker device from the secondary subset to the primary subset;

wherein a count of broker devices reassigned from the secondary subset to the primary subset is equal to a count of broker devices determined to have reached the threshold count for attestation.

20. The computer-implemented method of claim 19, wherein the defensive broker swap operation includes purging one or more broker devices from the determined plurality of broker devices available for attestation, wherein the purging occurs only upon detecting that one or more of the available broker devices have been compromised;

wherein attesting the first location of the first client device includes:

determining that that the first client device is not misrepresenting its location, based on historical merit information associated with the first client device; and attesting that the first client device is misrepresenting its location, whereafter the first application on first client device is denied access to a first location-based service;

wherein attesting the second location of the second client device includes:

determining that that the second client device is misrepresenting its location, based on historical merit information associated with the second client device; and attesting that the second client device is misrepresenting its location, whereafter the second application on second client device is denied access to a second location-based service.

* * * * *